Sept. 19, 1944.  H. H. BARNARD  2,358,308
PROPORTIONAL RECORDING INSTRUMENT
Filed Feb. 13, 1942  6 Sheets-Sheet 1

Inventor
Henry H. Barnard
By Young, Emery & Thompson
Attorneys

Sept. 19, 1944.     H. H. BARNARD     2,358,308
PROPORTIONAL RECORDING INSTRUMENT
Filed Feb. 13, 1942     6 Sheets-Sheet 2

Inventor
Henry H. Barnard
By Young, Emery & Thompson
Attorneys

Sept. 19, 1944.  H. H. BARNARD  2,358,308
PROPORTIONAL RECORDING INSTRUMENT
Filed Feb. 13, 1942  6 Sheets-Sheet 3
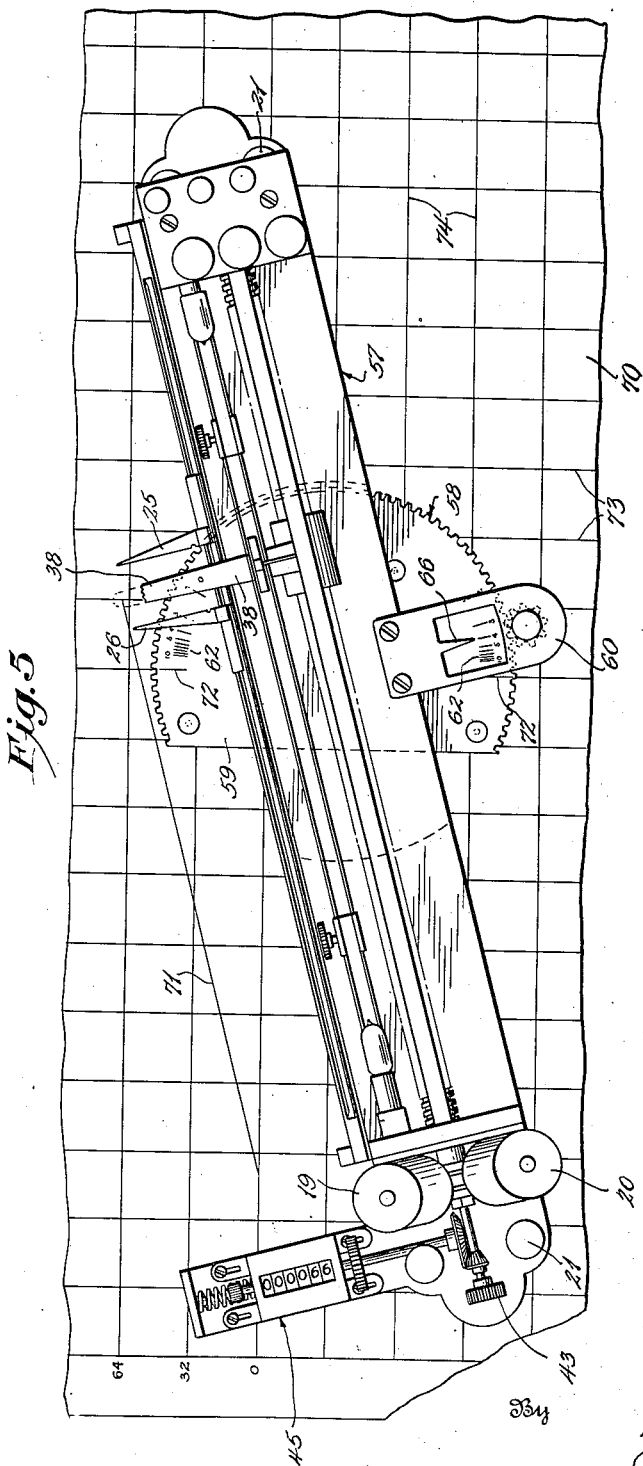
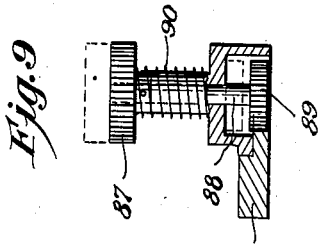
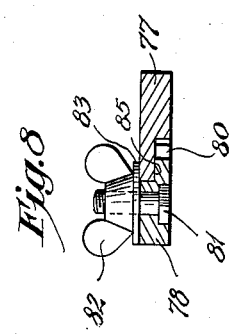
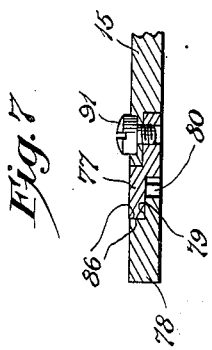
Inventor
Henry H. Barnard

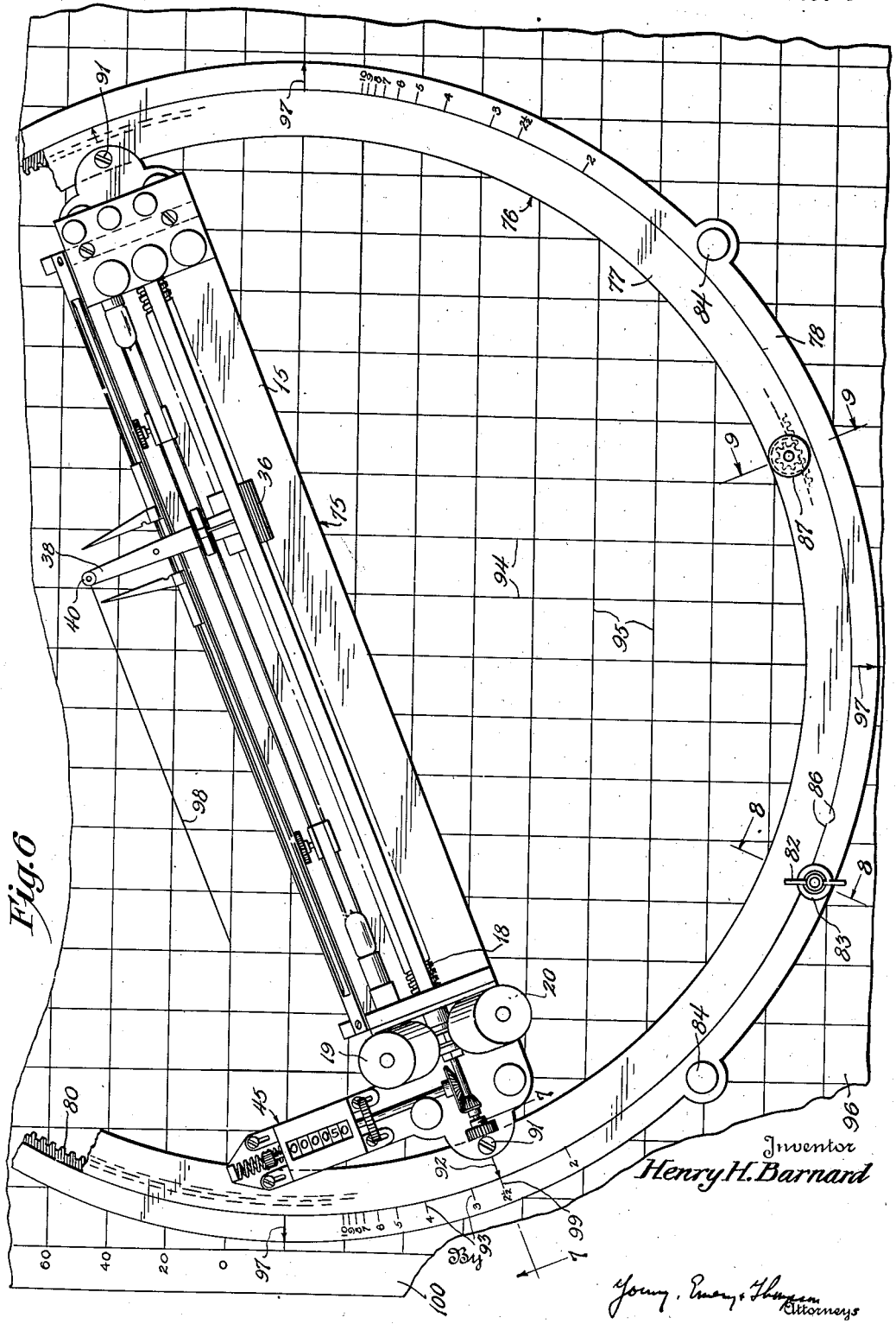

Sept. 19, 1944.  H. H. BARNARD  2,358,308
PROPORTIONAL RECORDING INSTRUMENT
Filed Feb. 13, 1942  6 Sheets-Sheet 5
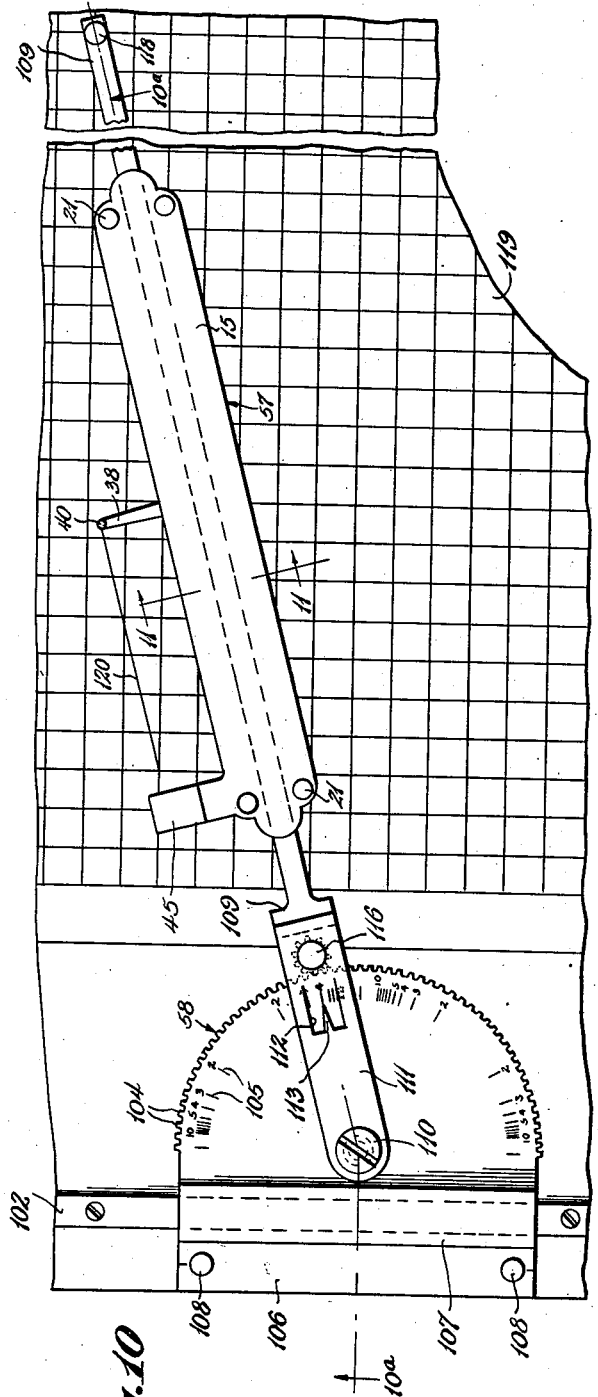
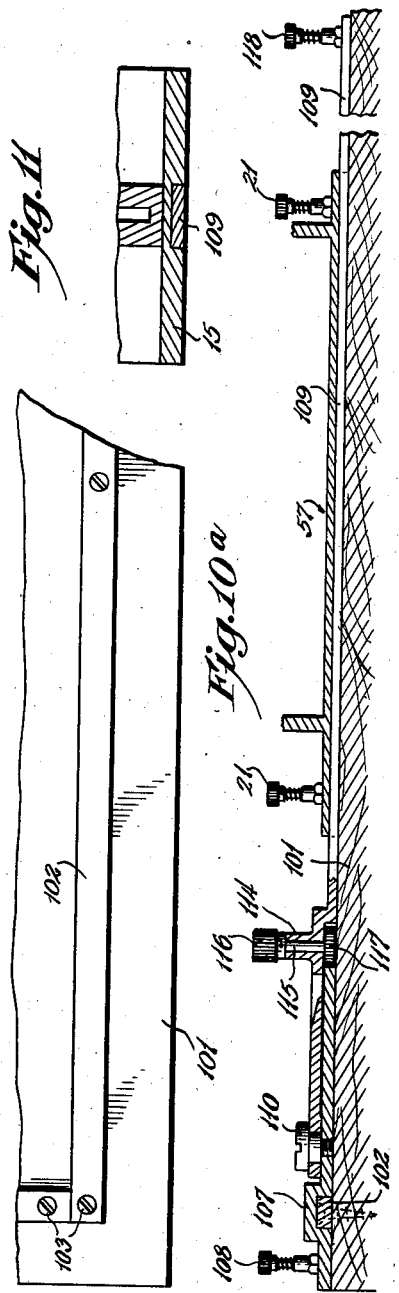
Inventor
*Henry H. Barnard*
By
*Young, Emery & Thompson*
Attorneys Sept. 19, 1944.                H. H. BARNARD                2,358,308
                        PROPORTIONAL RECORDING INSTRUMENT
                        Filed Feb. 13, 1942        6 Sheets-Sheet 6
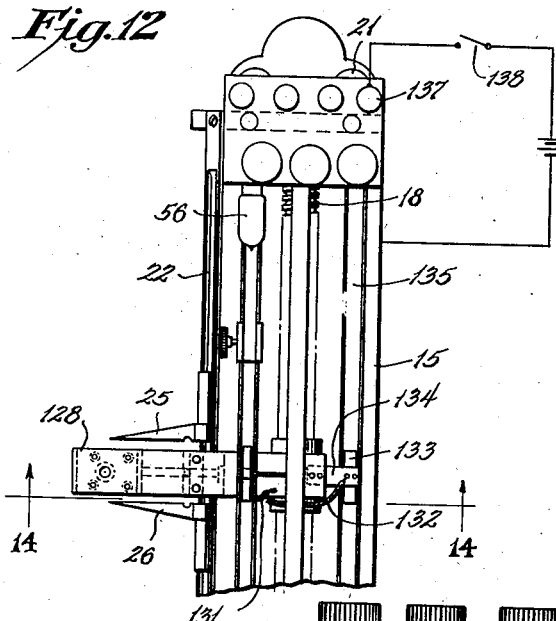
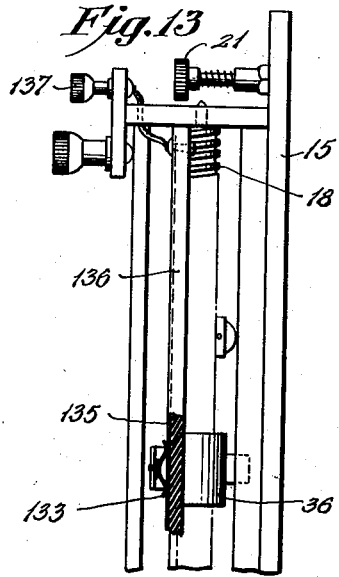
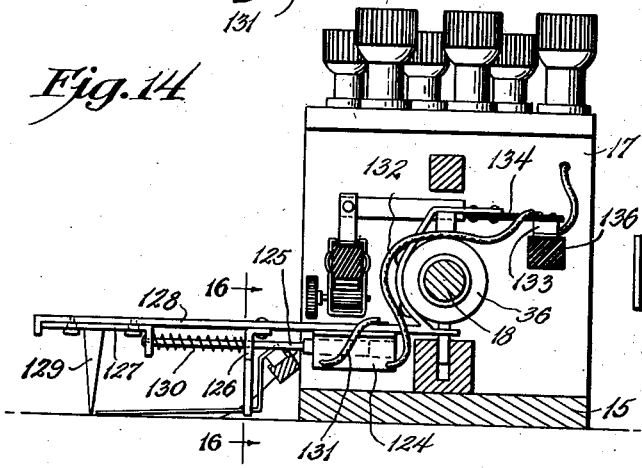
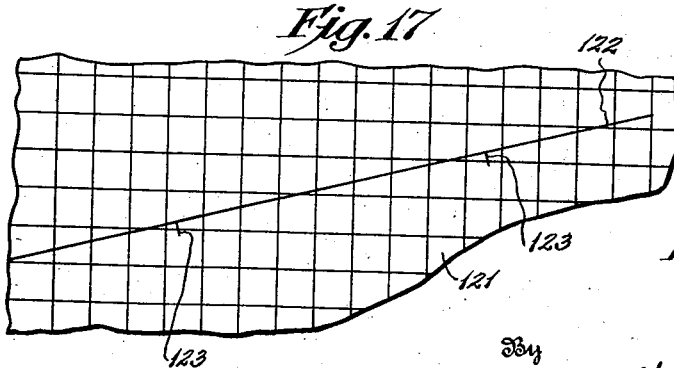
Inventor
Henry H. Barnard
By
Young, Emery & Thompson
Attorneys Patented Sept. 19, 1944

2,358,308

UNITED STATES PATENT OFFICE 2,358,308

PROPORTIONAL RECORDING INSTRUMENT

Henry H. Barnard, Washington, D. C.

Application February 13, 1942, Serial No. 430,812

1 Claim. (Cl. 33—26)

The present invention relates to a proportional recording and indicating instrument and constitutes an improvement of the instrument shown in my co-pending application, Serial No. 368,696, filed December 5, 1940. The instrument is adapted to be used to record and indicate data and information of any subject matter and is particularly useful in recording production, allocation of raw materials, transfer of commodities, monetary values, machines and equipment, etc. and any items in general.

It is an object of the invention to provide the instrument of my co-pending application with a proportioning gauge in order to graphically record and indicate any items utilizing the vertical and horizontal distances as coordinates of the items set up in the instrument. The recorded line is projected at an angle to the vertical to permit a greater proportion of items to be indicated graphically and visually. A further object of the invention is to combine a counter with the instrument whereby the actual number of items may be ascertained at a glance.

A still further object of the invention is to render it possible to set the instrument for a certain proportion so that the resulting line recorded on a record sheet can be visually observed as to the items which are to be counted by taking due note of the vertical distance represented by the lateral or angular distance of extent of the projected line.

Other objects will be apparent from the following description taken in connection with the accompanying drawings, in which:

Fig. 5 is a plan view showing the instrument in use,

Fig. 6 is a plan view of a modified construction shown on a portion of a record sheet, Fig. 7 is a cross section taken on line 7—7 of Fig. 6, Fig. 8 is a cross section taken on line 8—8 of Fig. 6, Fig. 9 is a cross section taken on line 9—9 of Fig. 6, Fig. 10 is a plan view of a second modified construction of the instrument shown mounted to a support and on a record sheet, Fig. 10a is a longitudinal sectional view taken on line 10a—10a of Fig. 10, Fig. 11 is a fragmentary cross section of the recording device and the guide bar taken on line 11—11 of Fig. 10, Fig. 12 is a plan view of a portion of the instrument showing a relatively movable line drawing device, Fig. 13 is a side elevation of the instrument of Fig. 12, Fig. 14 is a cross-sectional view taken on line 14—14 of Fig. 12, Fig. 15 is a bottom plan view of the line drawing device with its electromagnetic actuator, Fig. 16 is a sectional view taken on line 16—16 of Fig. 14, and Fig. 17 is a diagrammatic view of a portion of the graph paper.

Figure 3:
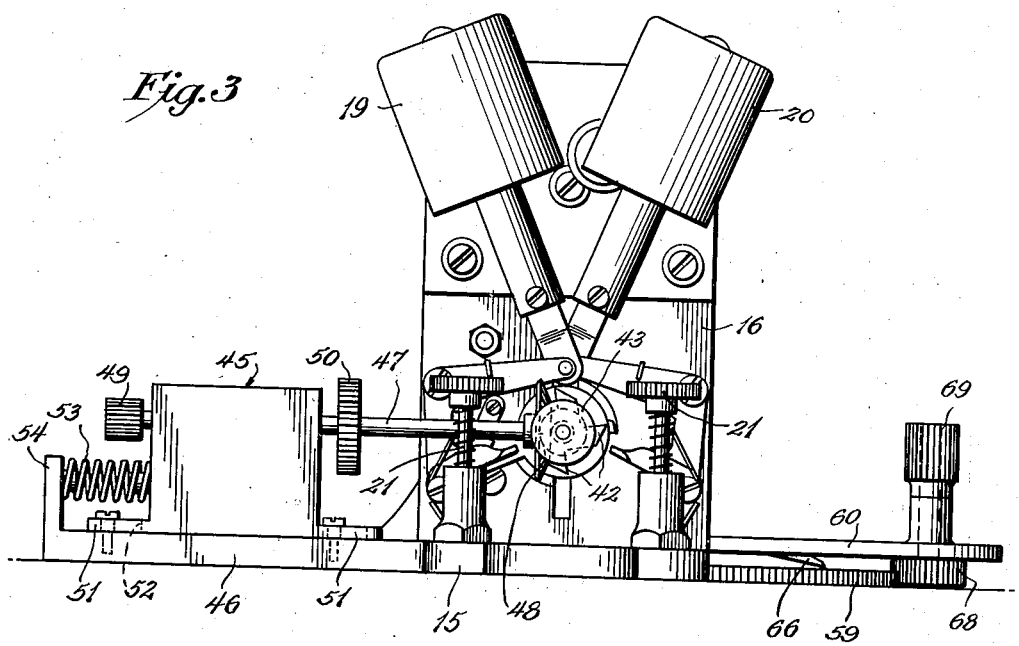
Fig. 3 is an end elevation of the instrument.
Figure 4:
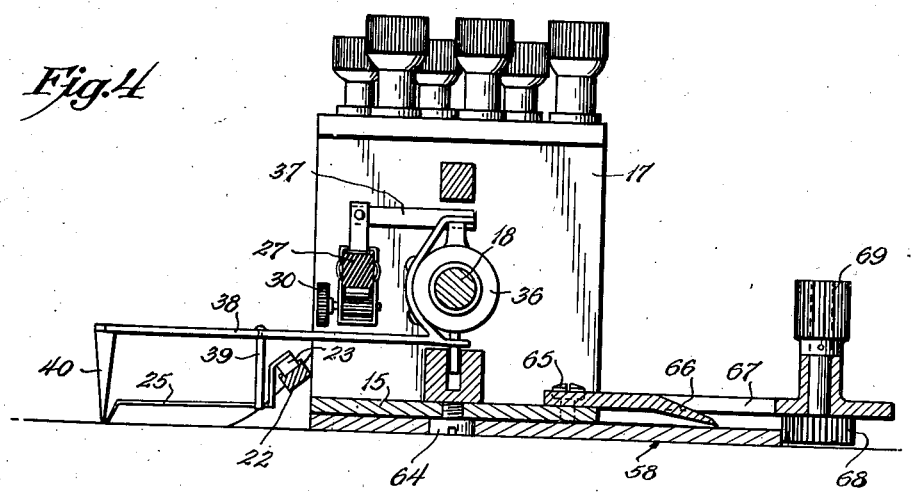
Fig. 4 is a cross-sectional view of the instrument taken on line 4—4 of Fig. 1.

The instrument of Figs. 1 to 5 embodies certain features which are described and illustrated in my said co-pending application. As shown in said application and as illustrated herein, a base plate 15 is provided with two uprights 16 and 17, one at each end thereof, in which a spiral grooved or threaded actuating rod 18 is rotatably mounted. A pair of solenoids 19 and 20 impart a quarter turn in counter or counterclockwise direction to the rod 18 by means of ratchet mechanism, Fig. 3, shown and described in said application. Each end of the base plate is provided with a pair of spring pressed pins 21 by means of which the instrument may be secured on a board or other support. The longitudinal guide track or rail 22 is suitably grooved to accommodate a pair of magnet bars or slugs 23 and 24 to each of which a pointer 25 and 26 respectively is secured. A second rail or track 27 is secured to the uprights 16 and 17 to receive the silver tapes or ribbons 28 and 29, each having an adjusting knob 30 and 31 to adjust the end edge 32 and 33 relative to a double contact strip 34 and 35.

The spiral grooved actuating rod 18 has a guide nut 36 threaded similarly to the rod so that upon rotation of the rod the nut will be moved longitudinally of the machine. The double contact strip 34 and 35 is secured to the nut 36 by means of an arm 37, Fig. 4, and a main arm 38 is secured to the nut having a depending actuating pin 39 for the pointers 25 and 26 and a marking or line drawing device or stylus 40 such as an ink retaining fountain. The fountain 40 is preferably in the shape of a cone having an upper opening and a bottom capillary port through which the ink flows to a record sheet or graph paper. Any other suitable inking or line drawing device may, of course, be used.

Figure 1:
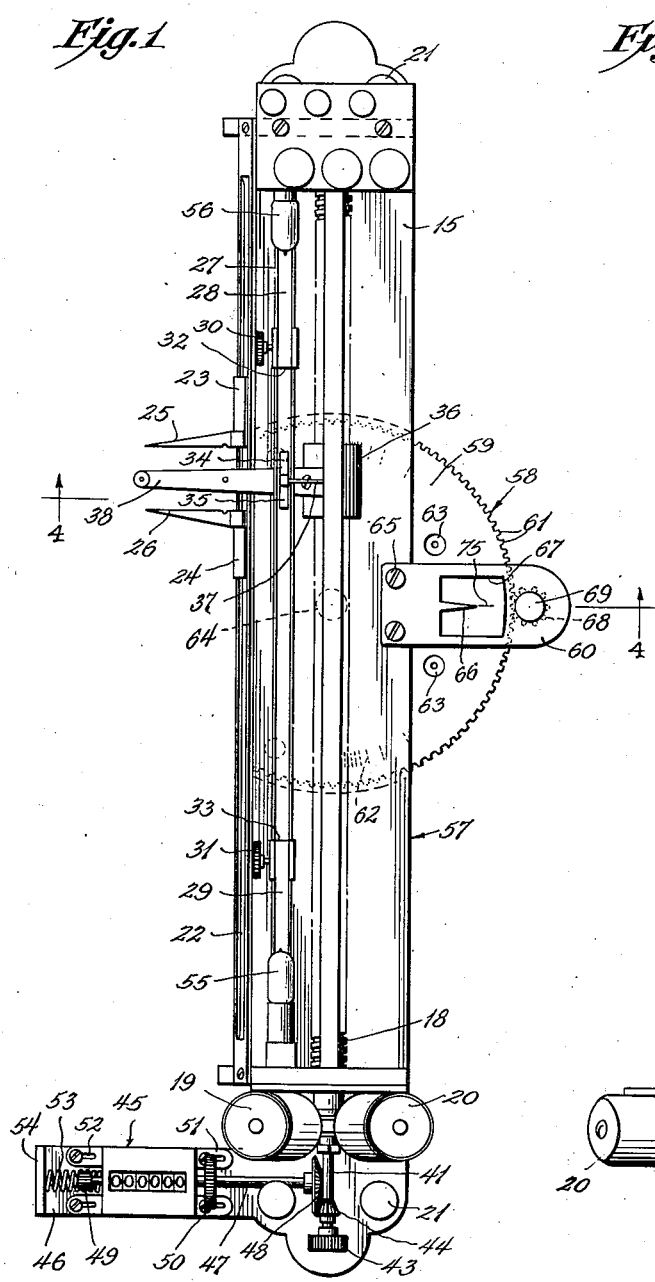
Figure 1 is a plan view of the instrument.
Figure 2:
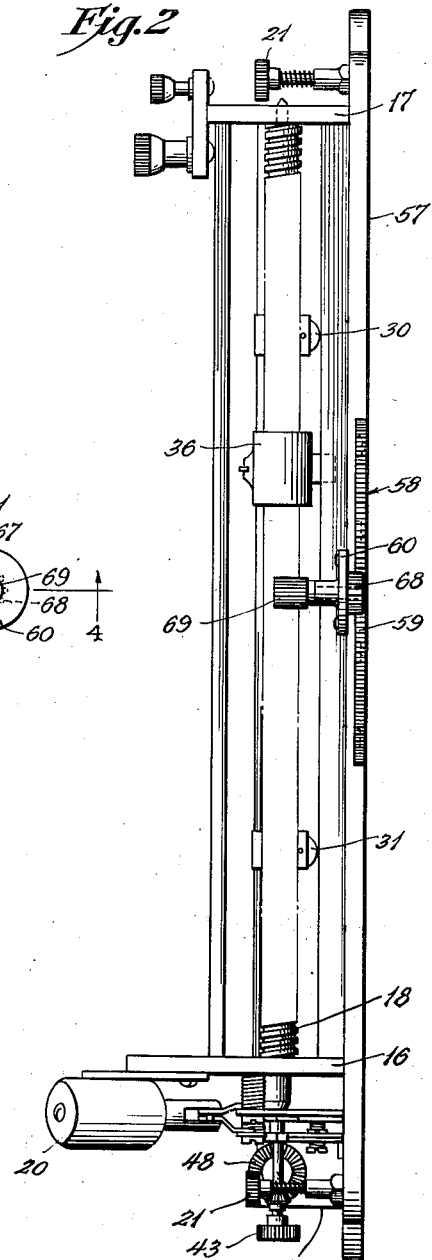
Fig. 2 is an elevation along one side of the instrument.

One end of the rod 18 has an extended portion 41 on which the spaced ratchet teeth 42, Fig. 3, are provided as well as a knurled knob 43 and a bevel gear 44, Fig. 1. The knob 43 is for the purpose of manually rotating the rod 18 to adjust the nut 36 and the indicating and marking device 40. A counter or odometer 45 of any suitable and well-known construction is provided on a lateral extension 46 of the base plate 15 and is operated by a shaft 47 having a bevel gear 48, the latter being adapted to mesh with the gear 44. Two knurled knobs 49 and 50 are provided on the shaft 47 of which knob 49 is for the purpose of clearing the counter, that is set it to zero, and knob 50 will set or advance the counter wheels numerically to any desired number.

As shown in Fig. 3, counter 45 is slidably mounted on the extension 46 by means of lugs 51 having slots 52 therein and limited by suitable means such as screw bolts. A spring 53 bearing against an upright portion 54 on the extension 46 forces the counter to the right, Fig. 3, to maintain the bevel gears 44 and 48 in mesh with each other.

The lamps 55 and 56 are adapted to function when respective contacts strips 34 and 35 contact or slide in contact with the respective tapes 28 and 29.

The instrument which may generally be referred to as an indicating and recording instrument 57 is used in combination with the counter 45 and a proportioning gauge 58.

The proportioning gauge 58 is composed of two parts, a scale portion 59 in the form of a part circular plate, and pointer or setting indicator 60 secured to the base plate 15. The scale portion 59 is provided with a series of peripheral teeth 61, scale graduations 62, a plurality of perforations 63 and a center perforation into which a pivot screw 64 is adapted to project. The screw 64 is threaded into the base plate 15 and the latter is cut out on the bottom side to accommodate the gauge 58, Fig. 4. The perforations 63 are adapted to receive pins to secure the gauge, if necessary, on a board or desk, not shown.

The setting indicator 60 is secured by any suitable means such as screws 65 to the base plate 15. A pointer 66 projects into the cut-out space 67 in the indicator which latter is for the purpose of permitting an accurate sight reading of the graduations 62 relative to the pointer 66. A setting and adjusting device is secured to the indicator 60 having a gear 68 and a knob 69 so that upon rotation of the knob 69 the instrument 57 may be set to any desired reading of the scale 62 relative to the pointer 66, the gear 68 meshing with the teeth 61 on the scale portion 59.

The indicating and recording instrument of Figs. 1 to 5 can be used in many different ways to indicate and record any desired items, values, composites, etc., such as certain parts or units of machines, equipment and accessories. Fig. 5 illustrates the device mounted on a sheet of graph paper 70 on which the line 71 has been recorded as follows:

The machine 57 is provided with the spiral rod 18 having four threads to the inch but as explained in my said co-pending application the rod 18 and its nut 36 are interchangeable for any other rod having for instance, a thread of one-half to forty to the inch more or less depending upon the ratio desired.

The proportional gauge 58 is first secured on the paper and board with the two guide lines 72 coinciding with one of the vertical lines 73 of the graph or record sheet 70 and it is then pinned down. The instrument 57 is now placed on the gauge by means of the pivot 64. The knob 69 is now rotated and thus the instrument 57 is adjusted to bring the pointer 66 in register with the specific graduation 62 corresponding to the proportion to be used and the machine 57 is then pinned down by the pins 21 on the board or other support. In the setting shown, Fig. 5, the pointer 66 is in register with a four graduation. The spiral rod 18 makes four turns to one inch travel of the nut 36 and therefore upon each impulse of the electromagnet 19 or 20 the rod is given a quarter turn resulting in a one-sixteenth inch travel of the nut 36 and the arm 38.

The machine is thus set for a four to one proportion which means that the recorder or stylus 40 travels on a diagonal one unit up on the graph paper for every four impulses. Assuming that the squares indicated by the lines 73 and 74 are one-half inch squares, the line 71 which has been recorded indicates sixty-six items and thus the counter 45 shows sixty-six. The graph paper is read by taking thirty-two units to each one-half inch vertical at the proportion set. The impulses are imparted into the machine by means of suitable control elements as for instance shown in my co-pending application, Serial No. 420,727, filed November 27, 1941.

The pointers 25 and 26 may be used under any circumstances to indicate any desired limits since such pointers are operated by the actuating pin 39 of the arm 38. Also the tapes 28 and 29 may be set to any adjusted position so that the respective contact strip 34 and 35 will close the circuit to its respective indicating light 55 and 56 to give a warning light when a limit or objective has been reached.

In the form of the instrument of Figs. 6 to 9 the machine 75 is exactly the same as the machine 57 of Figs. 1 to 5 except that the base plate is not provided with a cut-out section to receive the proportioning gauge. The proportioning gauge 76 comprises two concentric rings 77 and 78, of which the outer ring 78 has an inner cut-out portion 79, Fig. 7, and a circular gear rack 80. Also the outer ring 78 has one or more clamping or locking means, Fig. 8, each consisting of a bolt 81 with a winged nut 82 and a washer 83, the latter projecting over a portion of the inner ring 77 so that when the winged nut 82 is screwed down tight the washer will be frictionally held against both rings to maintain them in adjusted position. A plurality of pins 84 similar to pins 21 are secured to the ring 78 to securely fasten the ring on a record sheet and board.

The inner ring 77 also has a cut-out portion 85, Fig. 8, approximately corresponding to the cut-out portion 79 in the outer ring, thereby providing an interfit for the two rings with the two adjacent edges 86, Fig. 7, in contact with each other. A setting or adjusting device is shown in Fig. 9 consisting of a knurled knob 87 connected by a stem 88 to a gear 89, the latter meshing with the circular gear rack 80. A spring 90 tends to urge the knob and gear 89 in the raised position, shown in dotted lines in Fig. 9, so that the gears will be out of mesh.

The indicating and recording machine 75 is secured to the inner ring 77 by means of screws 91 and arrow graduation lines or marks 92 on the inner ring, Fig. 6, indicate the longitudinal axis of the machine 75. The outer ring 78 is provided with proportional lines or marks 93 corresponding to certain proportions to which the machine may be set relative to the graph lines 94 and 95 of the record or graph sheet 96. Another set of arrow graduation lines or marks 97 are provided on the outer ring 78 at diametrically opposite points.

The machine of Figs. 6 to 9 may be operated as follows, as explained in the setting of Fig. 6 and the line 98 recorded on the sheet 96, it being understood that the machine may be operated electrically as described and shown in my said co-pending applications.

The machine 75 and 76 is placed on the record sheet 96 and the ring 78 is lined up relative to the lines 94 and 95 on the record sheet by means of the arrow marks 97. With the winged nut 82 loose the inner ring 77 with the machine 75 is rotated to the proportion desired, as shown for instance, two and one-half to one, in which case mark 99 is lined up with the arrow mark 92 on the inner ring by means of the gear 89 and rack 80 by pressing down on the knurled knob 87. When adjusted as shown in Fig. 6, the winged nut 82 is tightened and the machine is ready to receive the impulses which will record the line 98 and operate the counter 45.

As shown on the edge 100 of the record sheet each horizontal line 95 read vertically equals twenty items so that the line 98 indicates fifty items drawn as a result of fifty impulses and fifty is registered in the counter 45, the line 98 having been started at the zero line.

In the apparatus according to Figs. 10 to 11, the instrument 57 comprises the elements and details as disclosed in Figs. 1 to 6. The modified structure is shown as mounted on a board or table 101 having marginal strips or slats 102 fastened by screws 103 or the like to the board. The proportioning gauge 58 is provided as usual with gear teeth 104 on the peripheral edge thereof and proportional graduations or marks 105. The gauge, which is similar to the one shown in Figs. 1 to 5, has, however, an extended portion 106 with a strip or bar receiving projection 107 and fastening pins 108.

A rod 109 is pivoted at a center point by means of a screw 110 at the center of the arc described by the gear teeth 104 and this rod has an enlarged portion 111 provided with a cut-out portion 112 and a pointer 113. The enlarged portion 111 is also provided with an upstanding collar 114, Fig. 10a, forming a bearing for a setting or adjusting device 115, of which the latter has an actuating knob 116 and a gear 117. This gear 117 meshes with the gear teeth 104 and upon rotation of the knob 116 the angular relationship of the rod 109 may be adjusted in dependence upon the desired proportion as indicated by the pointer 113 and the graduations 105. The end of the rod 109 is provided with a fastening pin 118 and this pin together with pins 108 will securely place the instrument on the board 101 relative to the record or graph sheet 119.

The instrument according to Figs. 10 to 11 may be operated in exactly the same manner as those of Figs. 1 to 9 but the advantage of the machine of Figs. 10 to 11 is that with one setting of the proportional gauge it is merely necessary to slide the instrument 57 on the rod 109 when a great many items are to be recorded without disturbing the proportional setting of the gauge. As shown in Fig. 10 the instrument 57 is pinned down on the board by the pins 21, the proportioning gauge 58 being set at four to one. The line 120 recorded on the sheet 119 indicates fifty-six items and this number shows in the counter 45. When the arm 38 and the stylus 40 have reached the upper end of the instrument 57, the pins 21 are pulled to release them from the board and the instrument 57 is moved by sliding action on the rod 109 to the right, Fig. 10, a suitable distance, after which the pins 21 are pushed again into the board and the arm 38 and stylus 40 is run back to the upper end of the line 120.

With this machine it is of course possible to use the proportional gauge 58 by securing it directly on the sheet 119 without thus using the strip 102. Also the proportional gauge 58 may be placed on a horizontal strip 102 instead of a vertical strip.

The instruments 57 and 75 of Figs. 1 to 10 show a stylus 40 which is stationary relative to the arm 38. If now it would be desired to indicate certain time intervals on the lines recorded on the record sheets, some line or mark would have to be applied manually. If it is desired to indicate and compare items hourly, daily, weekly, or any other time interval, it is necessary to automatically record a mark or other identifying character on the graph paper. Fig. 17 shows a portion of a record sheet 121 with a line 122 indicating a certain number of items and small marks 123 indicating time intervals. It is essential that the marks 123 be automatically recorded by the recording stylus and Figs. 12 to 16 illustrate an electromagnetically operated device for this purpose. As shown in Fig. 14 a solenoid 124 is secured on the underside of the recording arm or plate 128 and the core rod 125 of the solenoid is extended through a supporting plate 126 and is connected to a slide member 127. This slide member 127 is secured on the under side of the plate 128 and it carries the stylus or line drawing element 129. A spring 130 on the rod 125 moves the slide plate 127 and stylus 129 back to the left, Fig. 14, after each impulse of the magnet 124.

Electric current is supplied to the solenoid 124 by a ground wire 131 and a second wire 132 which latter is connected to a sliding contact member 133 mounted on an insulating arm 134 movable with the nut 36. A conducting strip 135 of metal is supported on an insulating bar 136 and a wire connects the strip with a binding post 137. Upon closing a circuit 138, Fig. 12, the solenoid is energized to operate the marking device.

The various parts of the machine may be made of any suitable materials and proportioning gauges as well as the base plate 15 may be made of metal or a transparent plastic material so that the lines on the record sheet will be visible. The proportioning gauges may be made of clear "Lucite" which is a hard material capable of being machined and ground to precise dimensions.

It is also obvious that the limit pointers 25 and 26 may be used to indicate the range of movement of the recording marker within a certain specified time limit. If the limit pointers are not to be used, it is merely necessary to move them to the end limits of the track 22 or remove them entirely.

Obviously, the present invention is not restricted to the particular embodiments herein shown and described. Moreover, it is not indispensable that all the features of this invention be used conjointly, since they may be employed advantageously in various combinations and subcombinations.

I claim as my invention:

A recording device comprising an instrument for indicating and recording items, a rod on which the instrument is slidably mounted, a gauge operatively connected to the rod and having a peripheral gear rack and proportional indicia indicated thereon, and a setting device on the rod cooperating with the gear rack to adjust the instrument relative to the gauge.

HENRY H. BARNARD.